United States Patent [19]
Nishimura

[11] Patent Number: 5,951,959
[45] Date of Patent: Sep. 14, 1999

[54] MESOPHASE PITCH-BASED CARBON FIBER FOR USE IN NEGATIVE ELECTRODE OF SECONDARY BATTERY AND PROCESS FOR PRODUCING THE SAME

[75] Inventor: Yoshiyuki Nishimura, Kamisu-machi, Japan

[73] Assignee: Petoca, Ltd., Tokyo, Japan

[21] Appl. No.: 08/639,974

[22] Filed: Apr. 29, 1996

[30] Foreign Application Priority Data

May 11, 1995 [JP] Japan ................................ 7-135619

[51] Int. Cl.⁶ ........................................................ D01F 9/12
[52] U.S. Cl. ................................... 423/447.1; 423/447.2; 264/29.2; 429/231.8
[58] Field of Search .......................... 423/447.1, 447.2, 423/447.4, 448, 445 R; 429/218, 194, 231.8, 23.4; 264/29.2

[56] References Cited

FOREIGN PATENT DOCUMENTS

| 0 551 878 | 7/1993 | European Pat. Off. . |
| 2 554 835 | 5/1985 | France . |
| 6-168725 | 6/1994 | Japan . |
| 7-57724 | 3/1995 | Japan . |
| 8-69798 | 3/1996 | Japan . |

OTHER PUBLICATIONS

Carbon, vol. 29, No. 1, pp. 51–60, 1991, T. L. Dhami, et al., "Oxidation Behaviour of Pitch Based Carbon Fibers" No month.

J. Electrochem. Soc., vol. 140, No. 2, pp. 315–320, Feb. 1993, N. Imanishi, et al., "Charge–Discharge Characteristics of Mesophase–Pitch–Based Carbon Fibers for Lithium Cells".

*Primary Examiner*—Anthony Skapars
*Attorney, Agent, or Firm*—Oblon, Spivak, McClelland, Maier & Neustadt, P.C.

[57] ABSTRACT

A mesophase pitch-based carbon fiber for use as a material for a negative electrode of a secondary battery, and a process for producing the same. The mesophase pitch-based carbon fiber comprises a columnar core part having a texture composed of a plurality of graphite layers extending along an axial direction and extending with minute flexures in a plane perpendicular to the axis and an outer-shell part surrounding the core part. The outer-shell part has a texture composed of a laminate of a plurality of graphite layers extending along an axial direction. The graphite layers are oriented in a plane perpendicular to the axis in a fashion such that the graphite layers extend along a circumferential direction with minute flexures while gradually receding from a center of the core part. In the carbon fiber, the graphite layers composing the outer-shell part have a laminate face forming a surface of the outer-shell part, channels permitting entry and exit of lithium ions being formed between graphite layers at the laminate face.

6 Claims, 5 Drawing Sheets

MESOPHASE PITCH-BASED CARBON FIBER FOR USE IN NEGATIVE ELECTRODE OF SECONDARY BATTERY AND PROCESS FOR PRODUCING THE SAME

FIELD OF THE INVENTION

The present invention relates to a carbon fiber for use as a material for a negative electrode of a secondary battery, which has a texture composed of a specified graphite layered structure, and further relates to a process for producing the carbon fiber. More particularly, the present invention is concerned with a mesophase pitch-based carbon fiber for use as a material for a negative electrode of a secondary battery, which has a texture composed of a specified graphite layered structure and which realizes a negative electrode enabling production of a secondary battery with a nonaqueous electrolyte having large charge and discharge capacities and a high energy density, and exhibiting excellent charge and discharge cycle characteristics and charge and discharge velocities, and further is concerned with a process for producing the mesophase pitch-based carbon fiber.

BACKGROUND OF THE INVENTION

The secondary battery in which an alkali metal such as lithium is used as an active material of a negative electrode has generally various advantages. For example, it not only ensures high energy density and high electromotive force, but also has wide operating temperature range due to the use of a nonaqueous electrolyte. Further, the secondary battery is excellent in shelf life, miniaturized and lightweight.

Therefore, the practical use of the above lithium secondary battery with a nonaqueous electrolyte is anticipated as a power source for use in a portable electronic appliance and also as a high-performance battery for use in an electric vehicle and electricity storage.

However, all the developed prototype batteries have not fully realized the above properties anticipated from the lithium secondary battery, and thus have been incomplete from the viewpoint of charge and discharge capacities, cycle life and energy density.

A major cause thereof resided in a negative electrode used in the secondary battery.

For example, a lithium secondary battery having a negative electrode composed of metal lithium incorporated therein had disadvantageously short cycle life and poor performance stability because lithium precipitated on the surface of the negative electrode during charging formed acicular dendrite causing short-circuit to be likely to occur between the negative and positive electrodes.

Lithium has extremely high reactivity, thereby causing the electrolyte to suffer from decomposition reaction in the vicinity of the surface of the negative electrode. Thus, there was the danger that the above decomposition reaction would modify the surface of the negative electrode to thereby cause repeated uses of the secondary battery to lower the cell capacity.

Various studies have been made on the material of the negative electrode with a view toward obviating the above problems of the lithium secondary battery.

For example, the use of alloys containing lithium, such as lithium/aluminum and Wood's alloy, as the material of the negative electrode of the lithium secondary battery has been studied. However, this negative electrode composed of such a lithium alloy had a problem of crystal structure change attributed to the difference in operating temperature and charge and discharge conditions.

Further, the use of carbon or graphite materials as the material of the negative electrode of the lithium secondary battery has been studied.

For example, an attempt has been made to capture lithium ions formed during charging between graphite layers of a carbon or graphite material (intercalation) to thereby produce a compound known as "intercalation compound" for the purpose of preventing the formation of dendrite.

Carbon fibers derived from coal, coke and PAN and isotropic pitch-based carbon fibers have been extensively studied as the above carbon materials.

However, these carbon materials have several drawbacks, for example, in that not only are graphite crystallites small but also the crystals are disorderly arranged, so that the charge and discharge capacities thereof are unsatisfactory and, when the current density is set high at the time of charging or discharging, decomposition of the electrolyte occurs to thereby lower the cycle life.

Graphite materials such as natural and artificial graphites are now attracting most intensive attention as the material of the negative electrode for use in the lithium secondary battery and are being extensively studied.

Although the chargeable or dischargeable capacity per weight of the natural graphite is pretty large if the graphitization degree is high, the natural graphite has drawbacks in that the current density ensuring ready discharge is low and in that the charging and discharging at a high current density would lower the charge and discharge efficiency. This natural graphite material is not suitable for use in a negative electrode of a high-load power source from which a large amount of current must be discharged and into which it is desired to effect charging at a high current density in order to cut charging time, e.g., a power source for a device equipped with a drive motor or the like.

Also, although the inter-graphite-layer volume as a whole is so satisfactory in the negative electrode composed of the conventional artificial graphite as long as the graphitization degree is high that large charge and discharge capacities are obtained, the artificial graphite has not been suitable for charging and discharging at a high current density.

In the contemporary lithium secondary battery in which use is made of the negative electrode comprising the graphite material, the current density at the time of charging is generally in the range of 20 to 35 mA/g, and thus the charging takes about 10 hours in view of the charge capacity. If the charging can be performed at a higher current density, for example, 100 mA/g, however, the charging time can be as short as 3 hours. Further, if the current density is 600 mA/g, the charging time can be even as short as 30 minutes.

It has been reported that, among the above graphite materials which include natural and artificial graphites, a product of graphitization of carbon fiber derived from mesophase pitch as a starting material (hereinafter referred to as "graphite fiber") is superior in light of the results of measurement of various battery properties, as disclosed in Japanese Patent Laid-Open Publication No. 6(1994)-168725.

However, the carbon materials are various in the size and configuration of crystallites, the content of impurities, etc., depending on the type of the starting material and the manufacturing conditions. Thus, with respect to the above graphite fiber as well, it can hardly be stated that control optimum for the carbon material for lithium-ion secondary battery is being effected.

In recent years, attention is drawn to the relationship of the graphite layered structure or internal texture of a carbon fiber with the cycle life and charge and discharge characteristics of the lithium-ion secondary battery using the negative electrode formed of the carbon fiber, and a multiplicity of reports have been presented. It has now become apparent that the mesophase pitch-based carbon fiber does not necessarily possess the graphite layered structure or internal texture optimum for use in the negative electrode of lithium-ion secondary battery.

For example, J. Electrochem. Soc., 140, 315 (1993) reports that the orientation of internal graphite layers of the graphite fiber used in the negative electrode of the secondary battery has a conspicuous effect on the battery performance. This literature evaluates each of the straight radial texture in which the graphite layers are radially arranged, the flexed radial texture in which minutely flexed (zigzag) graphite layers are radially arranged, the double structure in which graphite layers that minutely flex at the outer-shell part but are linear at the core part are radially arranged and the concentric texture (onion structure) in which graphite layers concentrically lie one upon another, in a plane perpendicular to the axis of the graphite fiber.

As indicated in the literature, the entry of lithium ions from a circumferential surface is difficult in the carbon fiber having the structure in which the texture of graphite layers has concentrically grown in the fiber section, generally known as the onion structure, for example, the vapor-phase grown carbon fiber. Therefore, in the negative electrode formed of this carbon fiber, lithium ions enter and exit only through the fiber cross-section, so that an increase of charge and discharge velocity is accompanied by a conspicuous capacity lowering.

Consequently, the method is contemplated in which the fiber length is reduced to thereby maximize the section surface area per fiber so that the entry and exit of lithium ions through the section are facilitated.

However, reckless pulverization of the fiber for reducing the fiber length causes unfavorable exposure of active graphite layer leading to reaction with the electrolyte, so that disadvantages such as capacity lowering would result.

Further, the method is known in which activation is carried out under special conditions so as to provide the surface of the fiber with pores permitting the entry of lithium ions, as disclosed in Japanese Patent Laid-Open Publication No. 7(1995)-57724. However, in this method, there is the possibility that oxygenic functional groups are formed during the activation, which react with the electrolyte. Therefore, the use of the carbon fiber of the onion structure in the negative electrode has various problems to be solved.

In J. Electrochem. Soc., 140, 315 (1993), it is taught that the graphite fiber of flexed radial texture would lead to exhibition of good battery performance from the viewpoint that lithium ions can enter through the circumferential surface of the fiber and that the fiber is resistant to the destruction attributed to the repetition of expansion and shrinkage of the fiber which is effected by the intercalation and deintercalation of lithium ions.

However, as a result of the inventors' detailed studies, it has become apparent that, with respect to the above carbon fiber of flexed radial texture as well, the initial charge and discharge efficiency (discharge capacity at the first cycle/charge capacity at the first cycle) is low and a capacity lowering (cycle deterioration) is recognized upon the repetition of charge and discharge for a prolonged period of time.

The applicant of this application previously proposed a graphite fiber having a graphite layered structure in which each end of gaps between graphite layers is exposed on the circumferential surface of the graphite fiber and also a material for a negative electrode of lithium-ion secondary battery which includes the above graphite fiber (reference is made to Japanese Patent Application No. 6(1994)-85246). Although the secondary battery including this material for a negative electrode of lithium-ion secondary battery exhibit excellent battery performances such as large charge and discharge capacities and capability of having the current density set high at the time of charge and discharge, the graphite layered structure still has the possibility that the graphite layers deteriorate because of lithium intercalation and deintercalation executed for a relatively prolonged period of time, which thereby deteriorates the battery performances.

Therefore, no carbon fiber has yet been obtained which can resolve all the problems of the conventional material for a negative electrode of lithium-ion secondary battery, such as small charge and discharge capacities, low charge and discharge efficiency at the initial stage, low charge and discharge velocities and short cycle life, and the development of such a carbon fiber is desired.

The inventors have made extensive and intensive studies on the texture and structure of carbon fibers with a view toward resolving the above problems of the prior art. As a result, it has been found effective in improving the charge and discharge efficiency and cycle characteristics of the secondary battery to make a texture of a carbon fiber composed of graphite layers having minute flexures and to laminate these graphite layers to each other so as to orient in a specified direction at an outer-shell part forming a circumferential surface of the fiber. The present invention has been completed on the basis of this finding.

OBJECT OF THE INVENTION

The present invention has been made in order to resolve the above problems of the conventional carbon fibers as materials for a negative electrode of secondary battery. An object of the present invention is to provide a mesophase pitch-based carbon fiber as a material for a negative electrode of secondary battery which has a specified graphite layered texture/structure and which can be used in a negative electrode of a secondary battery with a nonaqueous electrolyte having large charge and discharge capacities and a high energy density and being excellent in charge and discharge cycle characteristics and in charge and discharge velocities. Another object of the present invention is to provide a process for producing the mesophase pitch-based carbon fiber.

SUMMARY OF THE INVENTION

The mesophase pitch-based carbon fiber for use as a material for a negative electrode of a secondary battery according to the present invention comprises:

a columnar core part having a texture composed of a plurality of graphite layers extending along an axial direction and extending with minute flexures in a plane perpendicular to the axis, and an outer-shell part surrounding the core part and having a texture composed of a laminate of a plurality of graphite layers, said graphite layers extending along an axial direction and being oriented in a plane perpendicular to the axis in a fashion such that the graphite layers extend along a circumferential direction while gradually receding from a center of the core part with minute flexures, and wherein the graphite layers composing the outer-shell part have a laminate face forming a surface of the outer-shell part, channels permitting entry and exit of lithium ions being formed between graphite layers at the laminate face.

In the mesophase pitch-based carbon fiber for use as a material for a negative electrode of a secondary battery according to the present invention, it is preferred that the outer-shell part have a thickness which is at least 1%, especially, from 2 to 10% and, still especially, 2 to 5% of a fiber diameter.

The mesophase pitch-based carbon fiber of the present invention is preferably a milled carbon fiber. It is preferred that the milled carbon fibers have an aspect ratio (ratio of length of carbon fiber to diameter of carbon fiber) of 1 to 20, especially, 1 to 10 and a fiber diameter variation coefficient of 10 to 50%, especially, 15 to 40%.

In the mesophase pitch-based carbon fiber of the present invention, it is preferred that elements other than carbon be not contained in an amount of greater than 5000 ppm. Further, it is preferred that the mesophase pitch-based carbon fiber have a graphite crystal structure in which, as crystallite parameters of X-ray diffractometry, spacing of lattice planes($d_{002}$) ranges from 3.36 to 3.45 Å, especially, from 3.36 to 3.38 Å, crystallite size along the c-axis (Lc) is at least 100 Å, especially, 200 to 800 Å and crystallite size along the a-axis (La) is at least 70 Å, especially, 100 to 1000 Å.

The process for producing a mesophase pitch-based carbon fiber for use as a material for a negative electrode of a secondary battery according to the present invention produces the above defined carbon fiber and comprises the steps of:

spinning a mesophase pitch at a spinning viscosity of not greater than 100 poise, preferably, 1 to 70 poise and, still preferably, 3 to 30 poise and at a cooling rate of at least $1 \times 10^{5\circ}$ C./sec, preferably, $2 \times 10^5$ to $5 \times 10^{7\circ}$ C./sec and, still preferably, $2 \times 10^5$ to $1 \times 10^{7\circ}$ C./sec to thereby obtain a pitch fiber, infusibilizing the obtained pitch fiber, and carbonizing or graphitizing the infusibilized pitch fiber.

DETAILED DESCRIPTION OF THE INVENTION

The mesophase pitch-based carbon fiber and the process for producing the same according to the present invention will be illustrated below. Herein, the terminology "carbon fiber" is used in the broad sense and includes not only ordinary carbon fibers but also graphite fibers. Further, the carbon fiber comprehends those of various forms and configurations, such as carbon fibers in the form of a paper, film, mat, nonwoven or woven fabric and the like composed of continuous or relatively long fibers, milled carbon fibers and microballoon-shaped carbon fibers.

The mesophase pitch-based carbon fiber as a material for a negative electrode of secondary battery according to the present invention is characterized by having graphite layers provided with minute flexures (highly flexed or zigzagged) in a plane perpendicular to the axis of the fiber, which graphite layers are oriented in a specified direction to thereby form an internal texture of the carbon fiber.

Figure 1:
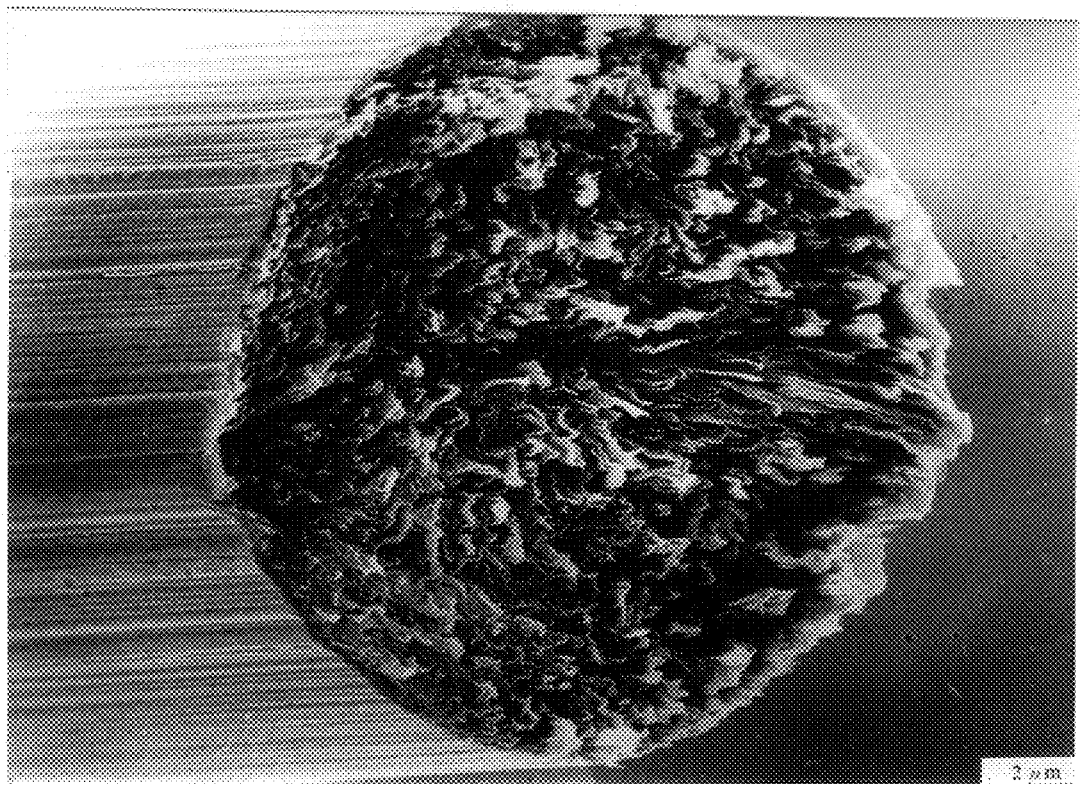
FIG. 1 is a scanning electron micrograph (SEM) of a section and a side face of one embodiment of the carbon fiber according to the present invention.

The internal texture of the mesophase pitch-based carbon fiber of the present invention will be described in greater detail with reference to FIGS. 1 to 5. FIG. 1 is a scanning electron micrograph (SEM) of a section and a side face of one embodiment of the carbon fiber according to the resent invention, FIG. 2 is an enlarged SEM of an outer-shell part of the carbon fiber, and FIG. 3 is a schematic view of the state of orientation of graphite layers in a section of the carbon fiber.

Figure 2:
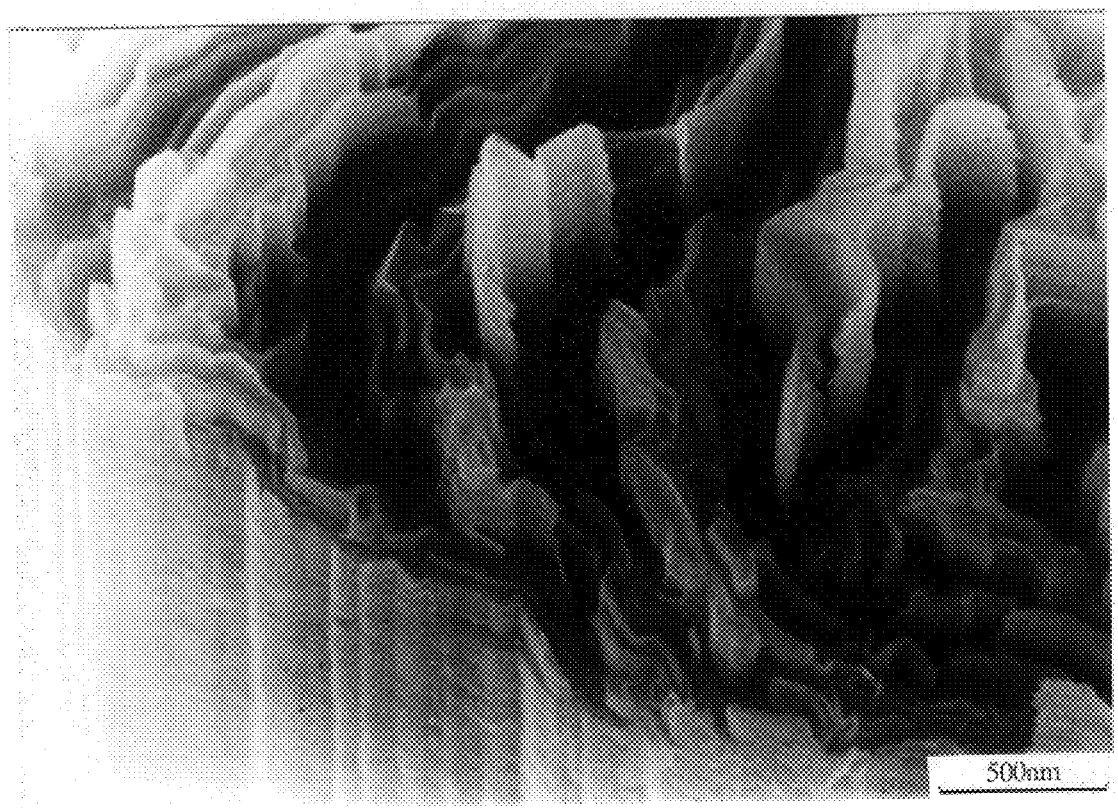
FIG. 2 is an enlarged SEM of an outer-shell part of the carbon fiber shown in FIG. 1.
Figure 3:
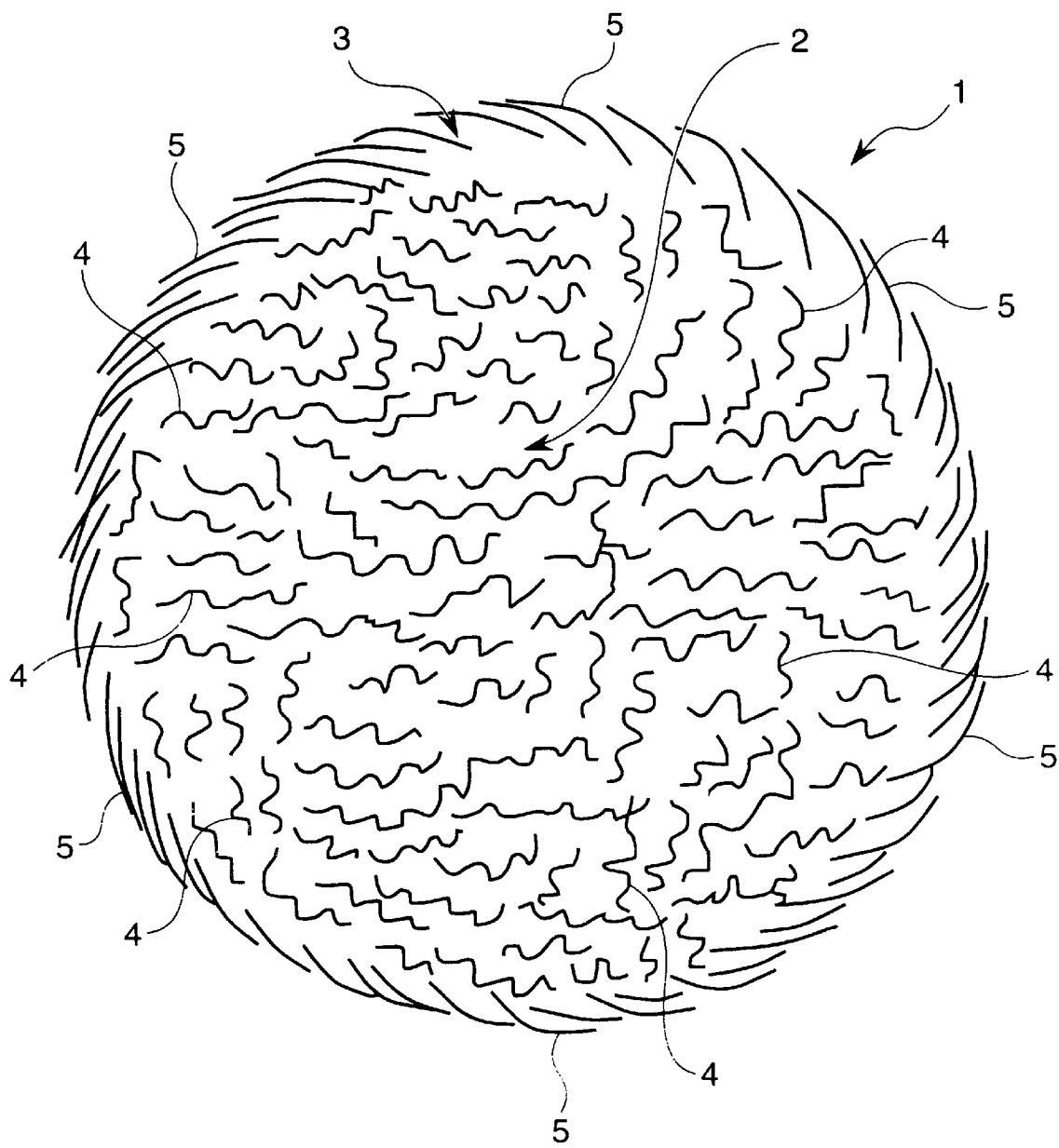
FIG. 3 is a schematic view of the state of orientation of graphite layers in a section of the carbon fiber shown in FIG. 1.

Referring to FIGS. 1 to 3, specifically to FIG. 3, the mesophase pitch-based carbon fiber 1 of the present invention has a core part 2 of columnar configuration and an outer-shell part 3 surrounding the core part. These core part 2 and outer-shell part 3 have textures composed of graphite layers 4 and 5, respectively, each of which is provided with minute flexures.

In the texture of the core part 2, the graphite layers 4 extend along the axial direction of the carbon fiber 1 and extend with minute flexures in a plane perpendicular to the axis. Although, in the example, the graphite layers 4 have random orientation in the plane perpendicular to the axis, the direction of orientation is not particularly limited. However, it is preferred to employ orientation directions enabling lithium ions to easily enter into and exit from the gaps (channels) between the graphite layers 4, which include not only the above random orientation shown in FIGS. 1–3 but also a radial direction orientation.

In the texture of the outer-shell part 3 surrounding the core part 2, the graphite layers 5 extend along the axial direction of the carbon fiber 1, are oriented in a fashion such that the graphite layers extend along a circumferential direction while gradually receding from a enter of the core part 2 with minute flexures in a plane perpendicular to the axis and are laminated or piled one upon another. The graphite layers 5 forming the outer-shell part 3 reach the surface of the outer-shell part 3 (fiber 1), and a laminate (piling) face of the graphite layers 5 constitutes the surface of the outer-shell part. Thus, channels permitting the entry and exit of lithium ions through the surface of the carbon fiber 1 are formed between graphite layers 5 at the surface of the outer-shell part 3.

In FIG. 1, the above texture of the outer-shell part 3 is observed as if it were the same as the flexed (zigzag) radial texture. However, referring to FIG. 2, a detailed observation shows that the graphite layers 5 of the outer-shell part 3 are oriented in a fashion such that the graphite layers extend along a circumferential direction from one end to the other end so as to gradually recede from a center of the core part 2 with minute flexures in a plane perpendicular to the axis and are piled one upon another. The graphite layers 5 reach the surface of the fiber (outer-shell part) at the above other end, where channels permitting the entry and exit of lithium ions are formed between graphite layers. This is also seen from the circumferential surface of the carbon fiber of FIGS. 1 and 2 having greater irregularities than on the surfaces of the vapor-phase grown carbon fiber and other graphite fibers of concentric texture.

In the use of the carbon fiber of the present invention as the material for a negative electrode of a lithium secondary battery, the laminate face of the graphite layers is exposed on the circumferential surface of the fiber to thereby cause all the surfaces of the fiber including the end faces of the fiber to have openings for the entry and exit of lithium ions. Thus, the entry and exit of lithium ions are facilitated. Further, in the use of the carbon fiber of the present invention, the charge and discharge capacities have little change and no fiber damaging occurs irrespective of the repetition of charging and discharging, so that the charge and discharge cycle characteristics are especially excellent. The reason would be that, when the intercalation and deintercalation of lithium ions between graphite layers are repeated by charging and discharging, the accompanying fiber expansion and shrinkage are absorbed by change of the distance between graphite layers and mutual slip (dislocation) of graphite layers at the outer-shell part composed of the above texture, so that the graphite layered structure does not suffer from damage. The deformation accompanying the expansion and shrinkage of the carbon fiber is especially conspicuous at the outer-shell part because of the columnar shape thereof. Therefore, the above function of the texture of the outer-shell part according to the present invention is particularly effective in realizing excellent charge and discharge cycle characteristics.

Figure 4:
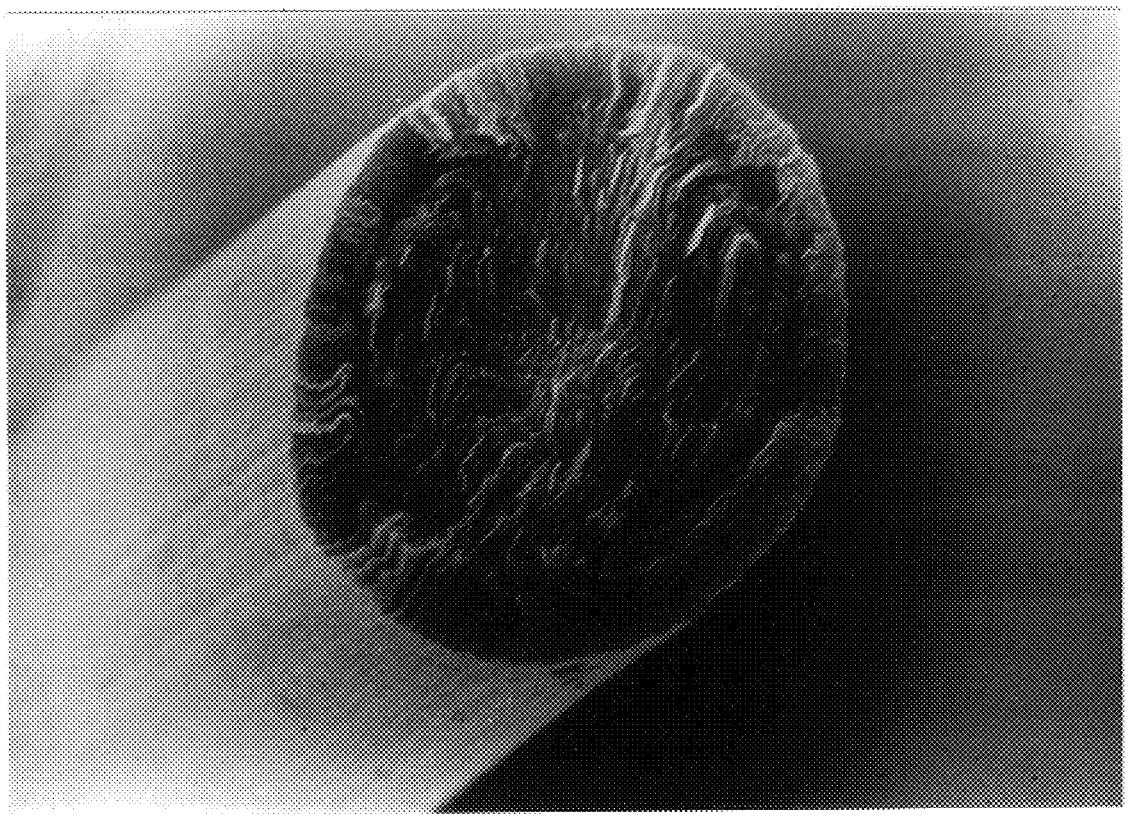
FIG. 4 is an SEM of a section of the conventional graphite fiber.
Figure 5:
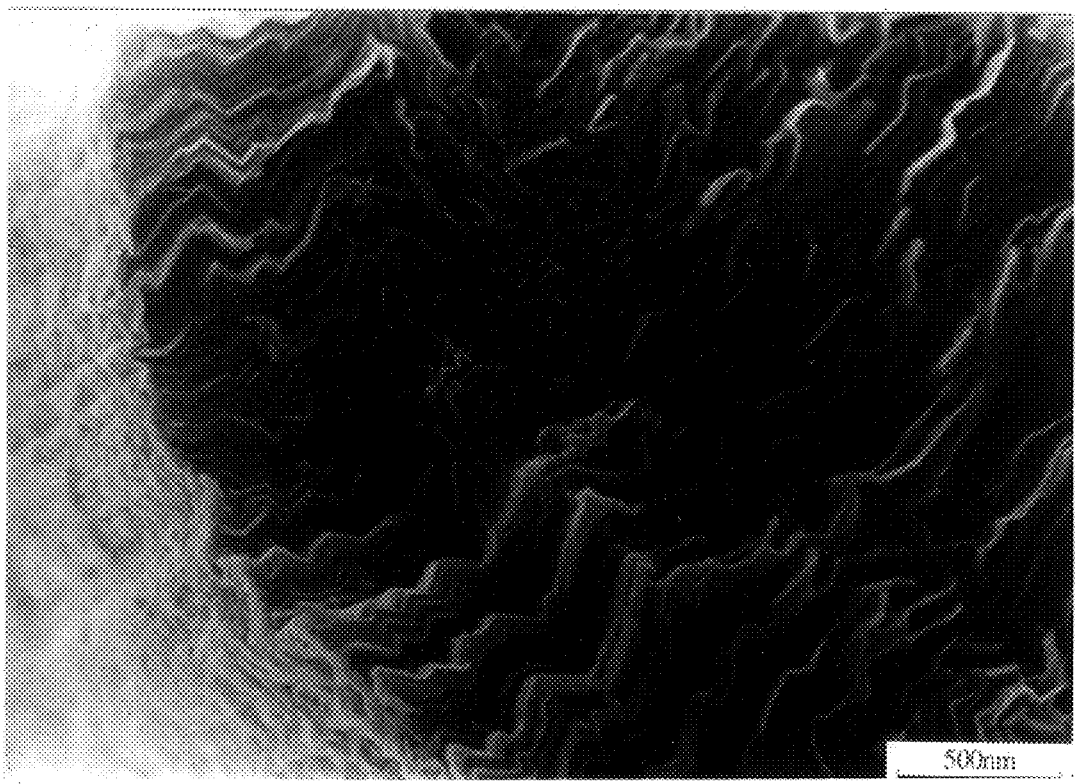
FIG. 5 is an enlarged SEM of a section of an outer-shell part of the graphite fiber shown in FIG. 4.

In contrast to the above carbon fiber of the present invention, the conventional carbon fiber such as that of FIGS. 4 and 5 suffers from lowering of charge and discharge capacities by the repetition of charging and discharging, so that, in conspicuous cases, fiber damaging would occur.

Illustratively, FIGS. 4 and 5 are SEMs of a section of conventional graphite fiber. These figures show that the carbon fiber has a flexed radial texture in which graphite layers provided with minute flexures extend in radial directions in the section. In this carbon fiber, the state of orientation of graphite layers does not differ between the core part and the outer-shell part. Therefore, the graphite layers reach the surface of the fiber in a manner such that these are nearly at right angles to the tangent to the surface of the fiber.

The above carbon fiber having the flexed radial texture is excellent in the case of lithium ion entry and exit as is the carbon fiber of the present invention. However, in the carbon fiber of the flexed radial texture, when the intercalation and deintercalation of lithium ions between graphite layers are repeated by charging and discharging, the accompanying fiber expansion and shrinkage are absorbed only by change of the distance between graphite layers. As mentioned above, the effect of the expansion and shrinkage of the carbon fiber is especially conspicuous at the outer-shell part, with the result that deterioration whose cause would be destruction of the graphite layered structure is gradually advanced by the repetition of charging and discharging, i.e., the repetition of expansion and shrinkage. In extreme cases, longitudinal cracking would occur along the graphite layer face of the fiber to thereby invite sudden lowering of capacity.

The carbon fiber of the above texture according to the present invention is also excellent from the viewpoint of the enhancement of compressive and impact strengths having been regarded as being drawbacks of the conventional mesophase pitch-based carbon fiber, so that it can suitably be employed as a fibrous reinforcement for plastics, etc.

In the mesophase pitch-based carbon fiber according to the present invention, it is preferred that the above outer-shell part have a thickness which is at least 1%, especially, from 2 to 10% and, still especially, 2 to 5% of a fiber diameter.

When the thickness of the outer-shell part is less than 1%, the above protective effect against expansion and shrinkage at the outer-shell part is reduced, so that a capacity lowering may occur by the repetition of charging and discharging. On the other hand, when the thickness of the outer-shell part is too large, the rate of diffusion of lithium ions is likely to be retarded. In this connection, the thickness of the outer-shell part can be easily measured by SEM observation.

The use of the negative electrode formed of the mesophase pitch-based carbon fiber of the above texture according to the present invention ensures excellent charge and discharge cycle characteristics as mentioned above. In particular, a lithium secondary battery can be provided whose capacity lowering is slight irrespective of increased charge and discharge velocities and whose capacity lowering hardly occurs irrespective of the repetition of charging and discharging.

The reason would be that, in the carbon fiber of the present invention, not only is the laminate face of the graphite layers exposed on the circumferential surface of the fiber to thereby facilitate the entry and exit of lithium ions through the surface of the fiber in the use in a negative electrode but also the expansion and shrinkage caused by the lithium ion entry and exit are absorbed by mutual slip or dislocation of graphite layers as well as change of the distance between surface graphite layer faces at the outer-shell part. Therefore, the negative electrode formed of the carbon fiber of the present invention enables repeating charge and discharge at high velocity for a prolonged period of time, during which the possibility of capacity lowering is little.

Moreover, the carbon fiber of the present invention is characterized by having high initial charge and discharge efficiency as compared with that of the graphite fiber having radial orientation effected up to a surface layer of the fiber. This would be attributed to the influence of the proportion of area of graphite layer edge portion relative to the fiber surface which is brought into contact with the electrolyte, and also the influence of the configuration of the above edge portion.

Herein, the terminology "milled carbon fiber" refers generally to the carbon fiber whose length is 1 mm or less. Thus, for example, the milled carbon fiber is different from the chopped strand of carbon fiber whose length exceeds 1 mm but is not greater than 25 mm. Also, this milled carbon fiber is different from the milled carbon fiber whose length is at least 200 $\mu$m, whose aspect ratio is relatively large [at least 20] and which has been blended into plastics and the like for the purpose of reducing the weight or increasing the rigidity thereof.

It is preferred that the above milled carbon fiber of the invention has an aspect ratio (ratio of length of carbon fiber to diameter of carbon fiber) of 1 to 20, especially, 1 to 10 and a fiber diameter variation coefficient of 10 to 50%, especially, 15 to 40%.

When the aspect ratio exceeds 20 or when the fiber diameter variation coefficient is less than 10%, space is likely to be formed between fibers to thereby render increasing the bulk density difficult and further render the electric conductivity low.

When the aspect ratio is as extremely high as over 20, i.e., when use is made of a milled carbon fiber of large length, not only is it difficult to increase the bulk density but also a short circuit might be caused between the positive and the negative electrodes. Further, when the aspect ratio is less than 1, the proportion of fibers suffering from longitudinal cracking along the fiber axis is likely to be increased.

When the diameter variation coefficient of milled carbon fiber exceeds 50%, too high a proportion of fibers of large diameter would be blended into the negative electrode, so that, unfavorably, either the surface of the electrode lacks smoothness or longitudinal fiber cracking is likely to occur because of the pressure focusing on fibers of large diameter at the time of roll molding.

Each of the above aspect ratio and fiber diameter variation coefficient is an average of measurements of 100 samples of the obtained milled carbon fibers.

In the particle size distribution by laser diffractometry of the milled mesophase pitch-based carbon fiber of the present invention, it is preferred that 10%, 50% and 90% cumulative diameters range from 10 to 14 $\mu$m, from 15 to 20 $\mu$m and 35 to 50 $\mu$m.

When the particle size is smaller than the above range, an active surface is apt to be so abundant that the decomposition of the electrolyte is rapid, the initial charge and discharge efficiency is low and the cycle deterioration is grave.

On the other hand, when the particle size is larger than the above range, there is a tendency that the bulk density of the electrode becomes low and the energy density per volume also becomes low. Further, the presence of long fibers in excess is detrimental to the avoidance of short circuit.

It is preferred from the viewpoint of enhancing the charge and discharge efficiency that the mesophase pitch-based carbon fiber of the present invention having the texture, in which the outer-shell part is composed of graphite layers oriented in a specified direction, be one highly purified.

The carbon fiber generally contains compounds of elements other than carbon, such as nitrogen, oxygen, sulfur and various metal components, depending on the type of the starting material.

In the secondary battery, lithium reacts with elements other than carbon, such as sulfur, nitrogen and halogens, to thereby form lithium compounds, so that the use of the carbon fiber containing such impurities in high proportions in a negative electrode leads to grave lowering of the charge and discharge efficiency, especially, the initial charge and discharge efficiency of the negative electrode.

Therefore, in the carbon fiber used as a material for a negative electrode, it is preferred that the total content of such impurities be limited to not greater than 5000 ppm, especially, not greater than 3000 ppm.

The above total content of impurities may be measured by the flame photometry, plasma fluorescence analysis, ion chromatography or the like.

Moreover, it is preferred that the carbon fiber for use in a negative electrode of secondary battery according to the present invention have a crystal structure in which, as crystallite parameters of X-ray diffractometry, spacing of lattice planes($d_{002}$) ranges from 3.36 to 3.45 Å, especially, from 3.36 to 3.38 Å, crystallite size along the c-axis (Lc) is at least 100 Å, especially, 200 to 800 Å and crystallite size along the a-axis (La) is at least 70 Å, especially, 100 to 1000 Å.

The X-ray diffractometry employed herein is a method in which a diffraction pattern of the carbon fiber is obtained with the use of Cuk$\alpha$ and a highly purified silicon as the X-ray source and reference material, respectively. The spacing of lattice planes ($d_{002}$) and size of crystallite along the c-axis ($Lc_{(002)}$) have respectively been calculated from the peak position and half-value width of the 002 diffraction pattern, and the size of crystallite along the a-axis ($La_{(110)}$) from the peak position and half-value width of the 110 diffraction pattern, in accordance with the method of the Japan Society for Promotion of Scientific Research.

The above described mesophase pitch-based carbon fiber for use as a material for a negative electrode of secondary battery according to the present invention can be produced by spinning a starting pitch, infusibilizing the resultant pitch fiber and effecting carbonization or graphitization thereof.

The process of the present invention will be described in greater detail below in respect of each of the steps thereof.

First, in the process of the present invention for producing the mesophase pitch-based carbon fiber for use as a material for a negative electrode of secondary battery, the starting pitch to be employed is an optically anisotropic pitch, i.e., mesophase pitch. The mesophase pitch can be produced from various raw materials such as petroleum and coal. In the process of the present invention, the type of the raw material is not particularly limited as long as the obtained pitch is spinnable.

Although the softening point of the starting pitch is also not particularly limited, a starting pitch having low softening point and high reaction rate in infusibilization is advantageous from the viewpoint that the production is stabilized and the cost is low. Specifically, it is preferred that the softening point of the starting pitch range from 230 to 350° C., especially, from 250 to 310° C.

For producing the carbon fiber of high purity, it is preferred not only to select a raw material whose impurities content is as low as possible but also to reduce the amount of impurities by filtration or other means in the preparation of the starting pitch.

In the present invention, the above mesophase pitch is spun at a spinning viscosity of not greater than 100 poise, preferably, 1 to 70 poise and, still preferably, 3 to 30 poise and at a cooling rate of at least $1\times10^{5}$ ° C./sec, preferably, $2\times10^{5}$ to $5\times10^{7}$ ° C./sec and, still preferably, $2\times10^{5}$ to $1\times10^{7}$ ° C./sec.

When the spinning viscosity is as high as greater than 100 poise and when the cooling rate is lower than $1\times10^{5}$ ° C./sec, a tendency is perceived that the outer-shell part becomes thin and the cycle deterioration becomes grave.

The production of the mesophase pitch fiber under the above conditions may be accomplished by the use of various techniques, such as melt (melt spinning, melt blow, etc.), centrifugal and vortex spinning techniques. Especially, the melt blow spinning technique is preferred collectively taking into account the production cost including the cost for installing spinning apparatus and the operating cost, the product quality control including the degree of freedom in controlling the fiber diameter, and the easiness in controlling the spinning viscosity and cooling rate as required herein.

The melt blow spinning of the pitch fiber enables spinning of a starting pitch having a viscosity as low as several to several tens of poises which has been believed to be difficult with the use of the conventional spinning techniques, while shortly chopping the fiber.

Further, the melt blow technique facilitates obtaining a fiber whose diameter is varied along the length thereof and enables producing a fiber having an appropriate diameter variation coefficient, for example, that mentioned above, without the need of using a special nozzle or blending of milled fibers. For attaining a desired fiber diameter variation coefficient, it is also advantageous to spin the pitch into pitch fibers through a spinning nozzle including a nozzle plate having a plurality of spinning orifices whose diameters are different from each other. Alternatively, it is feasible to in advance produce a plurality of pitch fibers with different diameters and then perform either appropriate blending followed by milling or milling followed by blending.

In the spinning of pitch fibers by the melt blow spinning technique, each spinning orifice is preferred to have a diameter ranging from 0.1 to 0.5 mm, especially, from 0.15 to 0.3 mm.

Further, the spinning speed is preferably at least 1000 m/min, still preferably, at least 2000 m/min and, particularly, at least 3000 m/min.

The spinning temperature is varied depending on the softening point of the employed mesophase pitch as the starting material and, generally, at least 300° C. On the other hand, the upper limit of the spinning temperature is preferably up to 400° C., still preferably, up to 380° C. from the viewpoint that the decomposition of the pitch is to be avoided.

Although the graphite layer orientation direction and the texture configuration of the carbon (graphite) fiber as the final product are slightly affected by the conditions of the infusibilization and carbonization/graphitization as the subsequent steps, fundamentally, the spinning conditions, especially, the spinning viscosity and cooling rate are intrinsic determinants therefor. In other words, the carbon fiber of the present invention having the texture of outer-shell part including the above graphite layers oriented in specified direction can be produced by infusibilizing the pitch fiber prepared under the above spinning conditions and thereafter carbonizing or graphitizing the infusibilized fiber.

With respect to the specified graphite layer orientation direction of the carbon fiber, its fundamental skeleton is already formed at the time of spinning, so that the possibility is anticipated that even the carbon fiber obtained by infusibilizing the pitch fiber spun under the above spinning conditions and subjecting the infusibilized fiber to heat treatment conducted at relatively low temperatures ranging from about 600 to 900° C. exhibits excellent electrode properties as compared with those of the conventional mesophase pitch-based carbon fiber.

In the process for producing the carbon fiber according to the present invention, the thus obtained pitch fiber is infusibilized and thereafter carbonized or graphitized.

The pitch fiber can be infusibilized by various methods, for example, the method in which the fiber is heated in an oxidative gas atmosphere of nitrogen dioxide, oxygen or the like, the method in which the fiber is treated in an oxidative aqueous solution of nitric acid, chromic acid or the like and the method in which the fiber is subjected to polymerization treatment using light or gamma rays.

A easier method for the infusibilization is one in which the fiber is heated in the air. In this method, the average temperature elevation rate is at least 3° C./min, preferably, at least 5° C./min.

In the present invention, the fiber thus infusibilized is heated in an inert gas or in the absence of oxidative gas to thereby convert it to a carbonized or graphitized fiber. The temperature elevation rate and heating temperature can be appropriately selected so as to obtain the desired internal texture, graphite content, hardness, etc. without fiber rupture at the time of heating and are not particularly limited.

The infusibilized fiber can be converted to a carbon fiber of high purity by carrying out carbonization or graphitization by the method comprising reacting chlorine or the like with impurities during carbonization or graphitization and removing the impurities as halides from the system, namely, purification treatment.

Although the carbon fiber of the present invention obtainable by the above process can be utilized in various forms as mentioned above, milled carbon fibers are preferred from the viewpoint of moldability into a negative electrode.

Milled carbon fibers can be efficiently produced by spinning out the pitch fiber and infusibilizing it according to the above process, followed by milling the infusibilized fiber.

It is especially preferred to employ the procedure comprising subjecting the infusibilized fiber to primary heat treatment (light carbonization) in an inert gas at, for example, 250 to 1500° C., preferably, 300 to 1500° C. and, still preferably, 500 to 900° C., milling the heat treated fiber and subjecting the milled fibers to secondary heat treatment (carbonization or graphitization) at a temperature of higher than 1500° C.

Conducting carbonization or graphitization at temperatures exceeding 1500° C. and thereafter milling is not desirable because not only are cracks likely to occur along the graphite layer plane having grown along the fiber axis but also the proportion of broken surface area to the total surface area of the milled carbon fiber is likely to increase to thereby invite the localization of electrons on the broken graphite layer plane and thus the decomposition of the electrolyte.

Application of the heat treatment for carbonization or graphitization at high temperatures to the milled infusibilized fibers or milled lightly carbonized fibers is effective in avoiding the longitudinal cracks of fiber by milling and in promoting the polycondensation and cyclization reaction on the graphite layer plane having newly exposed during milling at the time of the higher-temperature secondary heat treatment to thereby lower the activity of the surface, so that the decomposition of the electrolyte is effectively suppressed.

The milling of the infusibilized fiber or lightly carbonized fiber is effectively carried out, for example, by an apparatus adapted to revolve a rotor equipped with a blade at a high speed to thereby cut the fiber in the direction perpendicular to the fiber axis, in particular, by the use of, for example, the Victory mill, jet mill or cross flow mill.

In the use of the above apparatus, the length of milled infusibilized or lightly carbonized fibers can be controlled by regulating the rotating speed of the rotor, the angle of the blade, the size of porosity of a filter attached to the periphery of the rotor, etc. An appropriate fiber length is selected in conformity to the desired length of milled carbon fibers as the final product.

The use of the Henschel mixer, ball mill or crusher can be considered for milling the infusibilized fiber or the lightly carbonized fiber. However, this milling cannot be stated to be an appropriate means because not only does pressure apply to the fiber in the direction at right angles to the fiber to thereby increase the probability of longitudinal cracks along the fiber axis but also the milling takes a prolonged period of time.

The carbon fiber of the present invention obtainable by the above process can be suitably used in various forms as the material for a negative electrode of lithium-ion secondary battery.

For example, a material for a negative electrode of secondary battery can be fabricated by applying a binder to the obtained continuous carbon fiber or carbon fiber in the form of a sheet or mat and conducting press molding. However, for increasing the bulk density of the negative electrode material, the customary procedure is preferred in which the carbon fiber is first milled, then loaded with a binder and molded into a sheet, etc. For realizing a high bulk density and a high electric conductivity, it is preferred that the milled carbon fibers of the present invention have the above aspect ratio and fiber diameter variation coefficient.

Specifically, a high-performance negative electrode material can easily be obtained by adding a binder such as polyethylene or polytetrafluoroethylene to the milled carbon fibers of the present invention, forming the binder-loaded carbon fibers by means of rolls under pressure into a shape suitable for use in a negative electrode, e.g., a sheet or plate and conducting reduction treatment with the use of metallic lithium as the counter electrode.

The thus produced negative electrode material has a bulk density of generally at least 1.3 g/cm$^3$, preferably, at least 1.4 g/cm$^3$ and, still preferably, at least 1.5 g/cm$^3$, so that it is suitable for miniaturization of a battery.

The above negative electrode material may be provided with a current collector as is the conventional battery electrode. The current collector for the negative electrode may have the form of a plate, a foil or a rod and may be composed of a conductor electrochemically inert to the electrode and the electrolyte, e.g., selected from metals such as copper, nickel, titanium and stainless steel.

The negative electrode material composed of the carbon fiber of the present invention can be assembled together with an electrolyte in which a lithium salt is dissolved and a positive electrode material into a lithium-ion secondary battery. Although the type of the solvent for use in the electrolyte is not particularly limited, it is preferred that the solvent be selected from aprotic organic solvents having high dielectric constants.

Examples of such organic solvents include propylene carbonate, ethylene carbonate, tetrahydrofuran, 2-methyltetrahydrofuran, dioxolane, 4-methyldioxolane, acetonitrile, dimethyl carbonate, methylethyl carbonate and diethyl carbonate. These solvents may be used either individually or in appropriate combination.

For example, lithium salts capable of forming stable anions may be suitably used as the electrolytic substance to be contained in the electrolyte, which include, for example, lithium perchlorate, lithium borofluoride, lithium hexafluoroantimonate, lithium hexachloroantimonate and lithium hexafluorophosphate (LiPF$_6$).

Various materials may be used for composing the positive electrode of the above lithium-ion secondary battery, which include, for example, metal oxides such as chromium oxide, titanium oxide, cobalt oxide and vanadium pentoxide; lithium metal oxides such as lithium manganese oxide (LiMn$_2$O$_4$), lithium cobalt oxide (LiCoO$_2$) and lithium nickel oxide (LiNiO$_2$); transition metal chalcogen compounds such as titanium and molybdenum sulfides; and conductive conjugated polymeric substances such as polyacetylene, polyparaphenylene and polypyrrole.

The interspace between the above positive and negative electrodes is filled with the electrolyte. The electrolyte is generally caused to infiltrate a separator comprised of a nonwoven or woven fabric of synthetic or glass fibers, a polyolefinic porous membrane, a nonwoven fabric of polytetrafluoroethylene or the like and disposed in the interspace.

The negative electrode formed of the carbon fiber of the present invention is assembled together with the above electrolyte, positive electrode and separator and further with other battery constituting elements such as a gasket, a sealing plate and a casing into a cylindrical, rectangular or buttony lithium-ion secondary battery according to the customary procedure.

EFFECT OF THE INVENTION

The present invention provides a carbon fiber for use as a material for a negative electrode of secondary battery which has a texture of specified graphite layered structure. The lithium secondary battery including the negative electrode comprising the above carbon fiber has large charge and discharge capacities, especially, at the initial stage and a high energy density and is excellent in charge and discharge cycle characteristics and charge and discharge velocities.

The above carbon fiber can efficiently be produced by the process for producing a carbon fiber for use as a material for a negative electrode of a secondary battery according to the present invention.

EXAMPLES

The present invention will further be illustrated with reference to the following Examples, which should not be construed as limiting the scope of the invention.

Example 1

A starting material of optically anisotropic petroleum mesophase pitch having a specific gravity of 1.25 was spun through a nozzle comprising a 3 mm wide slit in which alternate lines of 500 spinning orifices each having a diameter of 0.2 mm were arranged, while injecting hot air through the slit to draw the molten pitch, thereby obtaining pitch fibers having an average diameter of 13 μm. The spinning temperature was 360° C. (spinning viscosity: 15 poise) and the delivery was 0.5 g/H-min.

The temperature at 50 mm below the nozzle was 160° C. which was sufficiently low for allowing the starting pitch to solidify. Accordingly, the average spinning rate was about 3000 m/min and the average cooling rate was 2×10$^{5\circ}$ C./sec.

The spun pitch fibers were collected on a belt having a collection zone of 20-mesh stainless steel net while sucking from the back of the belt.

The resultant collected fiber mat was heated in the air at a temperature which were elevated from room temperature to 300° C. at an average elevation rate of 6° C./min to thereby infusibilize the fiber mat. Subsequently, the thus obtained infusibilized fiber mat was subjected to lightly carbonization at 700° C. and milled with the use of a cross flow mill to thereby obtain milled carbon fibers. The lightly carbonized carbon fibers were graphitized at 3000° C. in an inert gas, thereby obtaining milled graphite fibers.

The particle size distribution of the milled graphite fibers was measured, and it was found that 10%, 50% and 90% cumulative diameters were 13 μm, 17 μm and 46 μm. The aspect ratio, the content of impurity elements and the fiber diameter variation coefficient of the milled graphite fibers were 3, 1700 ppm and 15%, respectively.

An SEM observation of a section of the thus obtained milled graphite fibers confirmed a texture as shown in FIGS. 1 and 2, in which graphite layers in the fiber interior (core part) had flexures of high degree and, at the fiber surface layer (outer-shell part), graphite layers extended in tilelike form in the circumferential direction of the fiber and were piled one upon another and in which channels were opened at between tilelike layer edges.

The thickness of the fiber surface layer having such pseudoonion texture was 3.2% of the fiber diameter.

5 g of the milled graphite fibers were kneaded together with 0.15 g of polytetrafluoroethylene to thereby obtain pellets, which were molded into a negative electrode. A charge and discharge test was performed with the use of a triode cell.

The charge and discharge capacity characteristics were measured with the use of metal lithium as a positive electrode in an electrolyte obtained by dissolving lithium perchlorate ($LiClO_4$) as an electrolytic substance in a 1:1 mixed carbonic ester solvent of ethylene carbonate (EC) and dimethyl carbonate (DMC) in a concentration of 1 M.

The measurement was made while conducting charge and discharge at a constant current of 100 mA/g. The discharge capacity was defined as the capacity until the fall of the cell voltage to 2 V.

Charge and discharge were repeated 20 times, and the measurement results showed that the initial discharge capacity and charge and discharge efficiency were 310 mAh/g and 94%, respectively, and that the discharge capacity retention at the 20th discharge (discharge capacity at the 20th discharge/discharge capacity at the initial discharge) was 98%.

Likewise, the effect of the charge and discharge velocity on the capacity was measured with the use of the above milled graphite fibers. The initial discharge capacities measured at charge and discharge velocities of 200, 400 and 600 mA/g were 302, 300 and 295 mAh/g, respectively, demonstrating that there is substantially no capacity lowering.

Example 2

In the same manner as in Example 1, spinning was conducted at a spinning temperature of 340° C. (spinning viscosity: 50 poise) and the fiber mat was infusibilized according to the customary procedure and graphitized at 3000° C. in argon.

The texture of a section of the thus obtained graphite fibers had pseudoonion graphite layers as shown in FIGS. 1 and 2 at the fiber surface layer (outer-shell part), and the thickness thereof was 2.2% of the fiber diameter. The aspect ratio, the content of impurity elements and the fiber diameter variation coefficient of the milled graphite fibers were 2, 2300 ppm and 25%, respectively.

The obtained mat of graphite fibers was interposed between nickel metal nets and immobilized by spot welding to thereby obtain a negative electrode. The battery performance was evaluated with the use of a triode cell including the obtained negative electrode.

Charge and discharge were repeated 20 times, and the measurement results showed that the initial discharge capacity and charge and discharge efficiency were 305 mAh/g and 93%, respectively, and that the discharge capacity retention at the 20th discharge was 97%.

The initial discharge capacities measured at charge and discharge velocities of 100, 200, 400 and 600 mA/g in the same manner as in Example 1 were 305, 303, 300 and 299 mAh/g, respectively.

The fact that there was substantially no effect of the charge and discharge velocity perceived in the use of the mat of graphite fibers as in the use of milled graphite fibers (Example 1) demonstrates that, with respect to the graphite fibers, the entry of lithium ions proceeds through the fiber surface with the same easiness as through the fiber cross-section.

Example 3

The same procedure as in Example 2 was repeated except that the spinning viscosity was 90 poise and the cooling rate was $1.2 \times 10^{5}$° C./sec.

The results are given in Table 1.

Comparative Example 1

The same starting material of petroleum mesophase pitch as employed in Example 1 was spun through a nozzle provided with spinning orifices each of 0.2 mm in diameter to thereby take up a pitch fiber on a bobbin.

The spinning was conducted under the conditions such that the spinning temperature, spinning viscosity and spinning rate were 310° C., 350 poise and 300 m/min, while the cooling rate was $7 \times 10^{4}$° C./sec.

The resultant pitch fiber was infusibilized and graphitized at 3000° C., thereby obtaining a graphite fiber. As shown in FIGS. 4 and 5, it was perceived that, although the internal part of the obtained graphite fiber had a texture having a relatively large proportion of flexures, the graphite layers had radial orientation up to a region very close to the fiber surface while a slight proportion of layers having oriented in the circumferential direction was present at the surface layer. The thickness of this layer was 0.7% of the fiber diameter.

The negative electrode performance of the graphite fiber was measured in the same manner as in Example 1.

As a result, it was found that, although the initial discharge capacity was 295 mAh/g, it was gradually lowered by the repetition of charge and discharge to thereby cause the capacity retention at the 20th discharge to be below 90%.

Moreover, the initial charge and discharge efficiency was 85%, the value was poor as compared with those of the Examples.

Comparative Example 2

The same procedure as in Comparative Example 1 was repeated except that the spinning temperature and spinning viscosity were 325° C. and 120 poise, respectively, and that the cooling rate was $9.0 \times 10^{4}$° C./sec. The resultant fiber having been graphitized at 3000° C. had a surface pseudoonion layer of thickness which was 0.8% of the fiber diameter nearly identical to that of Comparative Example 1.

The negative electrode performance of the graphite fiber is as specified in Table 1.

TABLE 1

|  |  | Example 1 | Example 2 | Example 3 | Comp. Ex. 1 | Comp. Ex. 2 |
|---|---|---|---|---|---|---|
| spinning viscosity | [poise] | 15 | 50 | 90 | 350 | 120 |
| cooling rate | [× $10^{4}$ ° C./sec] | 20 | 17 | 12 | 7 | 9 |
| thickness of surface pseudoonion layer (outer-shell part) | [%][1)] | 3.2 | 2.2 | 1.3 | 0.7 | 0.8 |
| initial discharge capacity | [mAh/g] | 310 | 305 | 305 | 295 | 30 |

TABLE 1-continued

|  |  | Example 1 | Example 2 | Example 3 | Comp. Ex. 1 | Comp. Ex. 2 |
|---|---|---|---|---|---|---|
| initial charge and discharge efficiency | [%] | 94 | 93 | 92 | 85 | 88 |
| capacity retention | [%][2] | 98 | 98 | 97 | 88 | 91 |
| aspect ratio |  | 3 | 2 | 7 | 10 | 14 |
| impurity elements | (ppm) | 1700 | 2300 | 1200 | 2500 | 3000 |
| fiber diam. variation coefficient | (%) | 15 | 25 | 12 | 3 | 5 |

Note
[1] ratio to fiber diameter.
[2] discharge capacity at the 20th discharge/discharge capacity at the initial discharge.

What is claimed is:

1. A mesophase pitch-based carbon fiber for use as a material for a negative electrode of a secondary battery, which comprises:

a columnar core part having a texture composed of a plurality of graphite layers extending along an axial direction and extending with minute flexures in a plane perpendicular to the axis, and an outer-shell part surrounding the core part and having a texture composed of a laminate of a plurality of graphite layers, said graphite layers extending along an axial direction and being oriented in a plane perpendicular to the axis in a fashion such that the graphite layers extend along a circumferential direction while gradually receding from a center of the core part with minute flexures, and wherein the graphite layers composing the outer-shell part have a laminate face forming a surface of the outer-shell part, channels permitting entry and exit of lithium ions being formed between graphite layers at the laminate face, and wherein a spacing of lattice planes ($d_{002}$) ranges from 3.36–3.38 Å.

2. The mesophase pitch-based carbon fiber as claimed in claim 1, wherein the outer-shell part has a thickness which is at least 1% of a fiber diameter.

3. The mesophase pitch-based carbon fiber as claimed in claim 1, wherein the carbon fiber has an aspect ratio (ratio of length of carbon fiber to diameter of carbon fiber) of 1 to 20 and a fiber diameter variation coefficient of 10 to 50%.

4. The mesophase pitch-based carbon fiber of claim 1, wherein elements other than carbon are not present in the fiber in an amount of greater than 5,000 ppm.

5. The mesophase pitch-based carbon fiber of claim 3, wherein said fiber diameter variation coefficient ranges from 15 to 40%.

6. A mesophase pitch-based carbon fiber for use as a material for the negative electrode of a secondary battery, prepared by a process comprising:

spinning a mesophase pitch at a spinning viscosity of not greater than 100 poise and at a cooling rate of at least $1 \times 10^{5}$° C./sec to thereby obtain a pitch fiber;

infusibilizing the pitch fiber obtained; and carbonizing or graphitizing the infusibilized pitch fiber, said pitch fiber having a structure of:

a columnar core part having a texture composed of a plurality of graphite layers extending along an axial direction and extending with minute flexures in a plane perpendicular to the axis, and an outer-shell part surrounding the core part and having a texture composed of a laminate of a plurality of graphite layers, said graphite layers extending along an axial direction and being oriented in a plane perpendicular to the axis in a fashion such that the graphite layers extend along a circumferential direction while gradually receding from a center of the core part with minute flexures, and wherein the graphite layers composing the outer-shell part have a laminate face forming a surface of the outer-shell part, channels permitting entry and exit of lithium ions being formed between graphite layers at the laminate face.

* * * * *